(12) United States Patent  
Kashihara et al.

(10) Patent No.: US 6,591,044 B2  
(45) Date of Patent: Jul. 8, 2003

(54) OPTICAL WAVEGUIDE CIRCUIT MODULE

(75) Inventors: Kazuhisa Kashihara, Chiyoda-ku (JP); Kazutaka Nara, Chiyoda-ku (JP); Tunetoshi Saito, Chiyoda-ku (JP); Takeshi Nakajima, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 120 days.

(21) Appl. No.: 09/961,371

(22) Filed: Sep. 25, 2001

(65) Prior Publication Data

US 2002/0064346 A1 May 30, 2002

(30) Foreign Application Priority Data

Oct. 18, 2000 (JP) ........................................ 2000-318088

(51) Int. Cl.[7] .................................................. G02B 6/10
(52) U.S. Cl. .............................. 385/51; 385/53; 385/55; 385/54; 385/132
(58) Field of Search ............................ 385/51, 55, 53, 385/54, 132, 129, 46, 24, 14

(56) References Cited

U.S. PATENT DOCUMENTS 6,501,896 B2 * 12/2002 Nara et al. ................ 385/129

* cited by examiner

Primary Examiner—Mohammad Sikder  
(74) Attorney, Agent, or Firm—Oblon, Spivak, McClelland, Maier & Neustadt, P.C.

(57) ABSTRACT

An optical waveguide circuit module of the invention is a highly reliable optical waveguide circuit module where cracks are not generated in an optical waveguide circuit chip housed even under a high temperature and high humidity environment. An optical waveguide circuit chip (25) comprises a waveguide forming region (10) formed on a substrate (1). The waveguide forming region (10) has a waveguide configuration sequentially connecting optical input waveguides (2), a first slab waveguide (3), an arrayed waveguide (4) made of a plurality of channel waveguides (4a) arranged side by side, the channel waveguides having a different length each other, a second slab waveguide (5), and a plurality of optical output waveguides (6) arranged side by side.

5 Claims, 6 Drawing Sheets

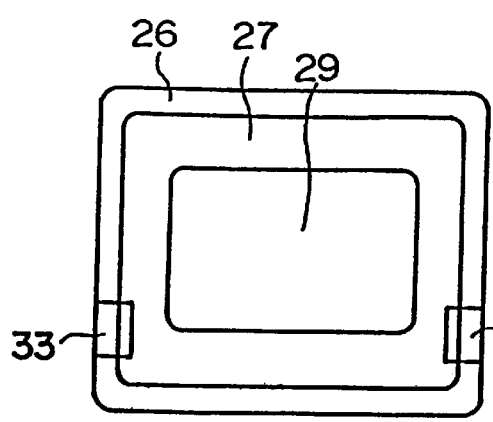
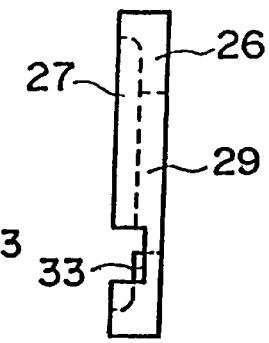
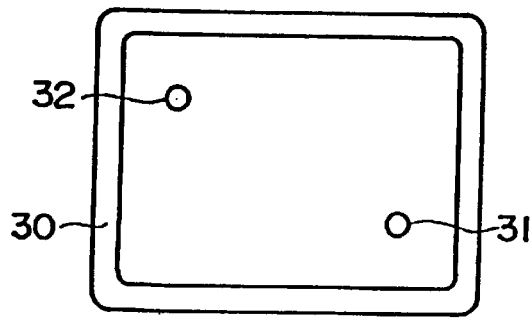
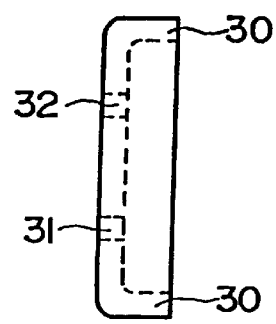
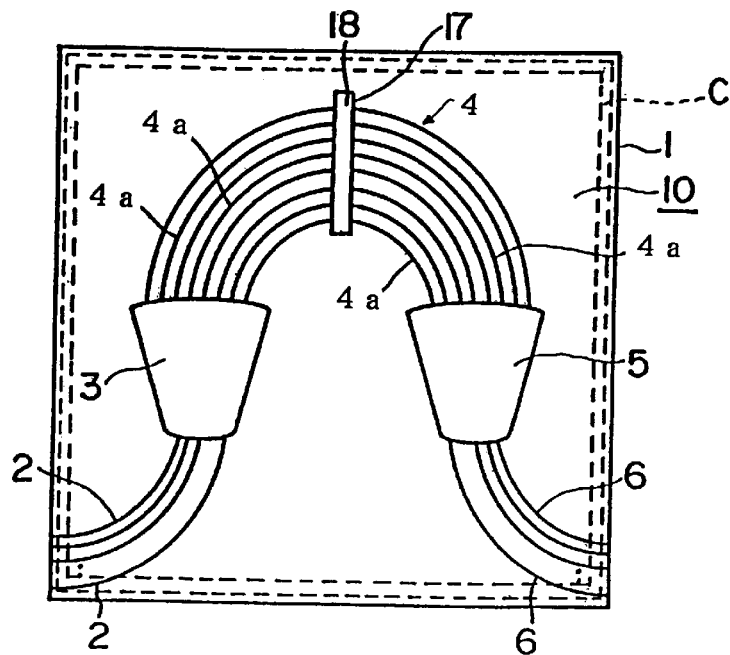

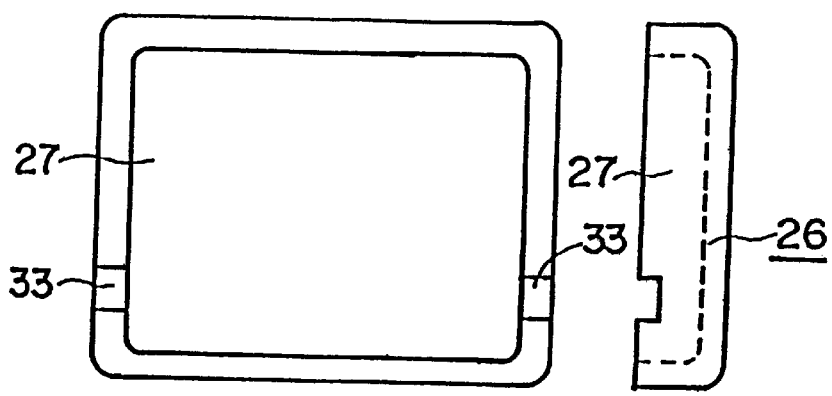
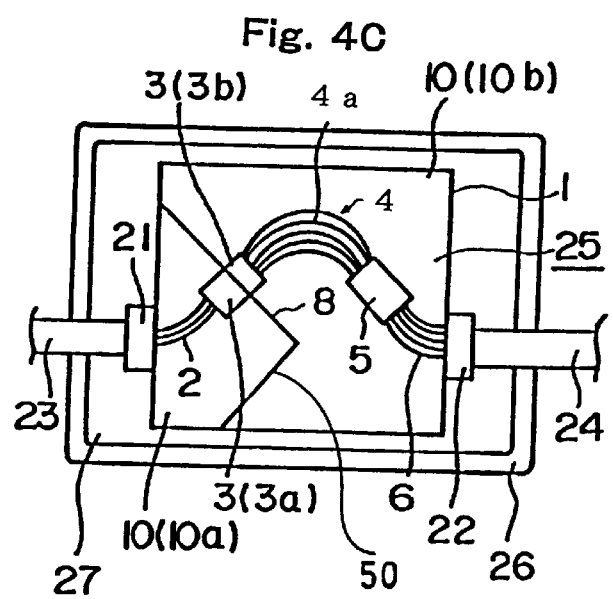
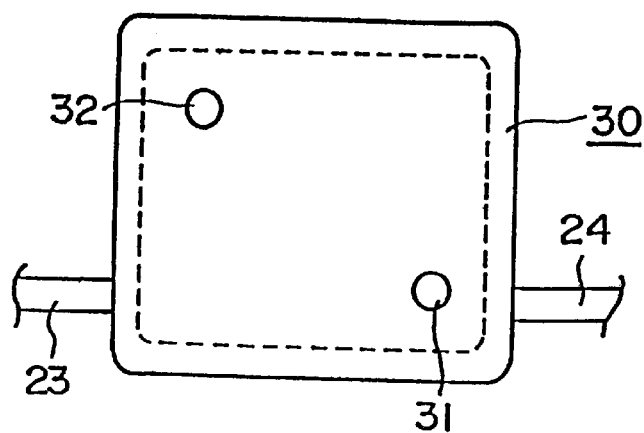

OPTICAL WAVEGUIDE CIRCUIT MODULE

BACKGROUND OF THE INVENTION

Recently, in optical communications, research and development of the optical wavelength division multiplexing communication have been conducted actively for the way to dramatically increase the transmission capacity thereof, and practical applications have been proceeding. The optical wavelength division multiplexing (WDM) communication is that a plurality of lights having a wavelength different from each other is wavelength-multiplexed and transmitted, for example. In such optical wavelength division multiplexing communication systems, lights need to be drawn out of the multiplexed light to be transmitted at every wavelength on the light receiving side. On this account, light transmitting elements that transmit light having only a predetermined wavelength need to be disposed in the systems.

As one example of the light transmitting elements, for example, there is an arrayed waveguide grating (AWG) as shown in FIG. 6. The arrayed waveguide grating is an optical waveguide circuit chip where a waveguide forming region 10 is formed on a substrate 1 such as silicon. The waveguide forming region of the arrayed waveguide grating has the following waveguide configuration.

The waveguide configuration of the arrayed waveguide grating is formed to have one or more of optical input waveguides 2; a first slab waveguide 3 connected to the output ends of the optical input waveguides 2; an arrayed waveguide 4 made of channel waveguides 4a arranged side by side, the channel waveguides being connected to the output end of the first slab waveguide 3; a second slab waveguide 5 connected to the output end of the arrayed waveguide 4; and a plurality of optical output waveguides 6 arranged side by side, the optical output waveguides being connected to the output end of the second slab waveguide 5. Additionally, the optical input waveguides 2 are also arranged side by side in plurals in FIG. 6.

The channel waveguides 4a are for propagating light that have been lead through the first slab waveguide 3, which are formed to have a length different from each other by a set amount. The length of adjacent channel waveguides 4a varies from each other by $\Delta L$. The channel waveguides 4a that constitute the arrayed waveguide 4 are generally disposed in multiple such as a hundred. However, in the same drawing, the number of the channel waveguides 4a is schematically depicted to simplify the drawing.

Furthermore, the optical output waveguides 6 are disposed corresponding to the number of signal lights having a different wavelength each other, the signal lights are demultiplexed or multiplaexed by the arrayed waveguide grating, for example. However, in the same drawing, the number of each of the optical output waveguides 6 or the optical input waveguides 2 is schematically depicted to simplify the drawing.

To the optical input waveguides 2, for example, optical fibers on the transmitting side (not shown) are connected to lead wavelength-multiplexed light. The light that has been lead to the first slab waveguide 3 through the optical input waveguides 2 spread by the diffraction effects thereof to enter each of the channel waveguides 4a, propagating through the arrayed waveguide 4.

The light that has propagated through the arrayed waveguide 4 reach the second slab waveguide 5. Then, they are condensed at the optical output waveguides 6 to be outputted. The length of the entire channel waveguides 4a that constitute the arrayed waveguide 4 varies from each other by the set amount. Thus, a shift is generated in the phase of the respective lights after propagating through the arrayed waveguide 4. According to this shifted amount, the phasefront of the light is tilted. The positions at which the light is condensed are determined by this tilted angle.

Therefore, the positions at which the lights having a different wavelength are condensed differ from each other. The optical output waveguides 6 are formed on the positions and thereby the lights having a different wavelength can be outputted from the different optical output waveguides 6 at every wavelength.

Additionally, the arrayed waveguide grating utilizes the principle of reciprocity (reversibility) of optical circuits. Thus, it has the function of an optical multiplexer as well as the function of an optical demultiplexer. That is, when a plurality of lights having a different wavelength enters from each of the optical output waveguides 6, these lights pass through a propagation path reverse to that described above, are multiplexed by the second slab waveguide 5, the arrayed waveguide 4 and the first slab waveguide 3 and are emitted from one of the optical input waveguides 2.

In such the arrayed waveguide grating, the wavelength resolution is in proportion to a length difference ($\Delta L$) of the adjacent channel waveguides 4a constituting the arrayed waveguide 4, as described above. Therefore, in the arrayed waveguide grating, the $\Delta L$ is designed large and thereby the optical multiplexing/demultiplexing of light(s) having a narrow wavelength spacing is made possible, which could not be realized by an conventional optical multiplexer/demultiplexer. For example, the $\Delta L$ is formed large to design a designed wavelength spacing to be 1 nm or less and thereby the function of demultiplexing or multiplexing a plurality of light signals having a wavelength spacing of 1 nm or less can be served. That is, the arrayed waveguide grating can serve the function of multiplexing and demultiplexing a plurality of signal light (s), which is needed to realize the high-density optical wavelength division multiplexing communications.

The waveguide forming region 10 of the arrayed waveguide grating described above has an under cladding layer, a core layer and an over cladding layer. The under cladding layer, the core layer and the over cladding layer are made of silica-based glass. The arrayed waveguide grating is formed by forming the under cladding layer on the substrate 1, forming the core layer having the waveguide configuration described above thereon and forming the over cladding layer that covers the core. Additionally, in the conventional arrayed waveguide grating, the over cladding has been formed of silica-based glass of pure silica glass added with 5 mol % of each of $B_2O_3$ and $P_2O_5$.

And now, in the arrayed waveguide grating as described above, it is known that polarization dependent loss is generated because an effective index of the TE mode differs from an effective index of the TM mode in the lights propagating through the arrayed waveguide 4.

Then, in order to compensate polarization dependent loss, a half waveplate 18 is traditionally disposed so as to cross the longitudinal center part of the entire channel waveguides 4a as shown in FIG. 6. Additionally, in the same drawing, a slit 17 is formed in the longitudinal center part of the arrayed waveguide 4 so as to be orthogonal to the arrayed waveguide 4. The half waveplate 18 is inserted into this slit 17 and is disposed orthogonal to the arrayed waveguide 4.

The half waveplate 18 disposed in the longitudinal center part of the arrayed waveguide 4 converts the TE mode to the TM mode or inversely converts the TM mode to the TE mode before and after the half waveplate 18. According to this conversion, the difference of the optical path between the TE mode and the TM mode (physical length×effective index) that has been generated before the light propagated through the arrayed waveguide 4 enter the half waveplate 18 is cancelled before propagating to the output end of the arrayed waveguide 4 and thus the polarization dependent loss is compensated.

SUMMARY OF THE INVENTION

An optical waveguide circuit module of the invention comprises:
- an optical waveguide circuit chip comprising a waveguide forming region made of silica-based glass formed on a substrate; and
- a housing for accommodating the optical waveguide circuit chip,
- wherein a water-insoluble oil is filled inside the housing.

BRIEF DESCRIPTION OF THE DRAWINGS

Exemplary embodiments of the invention will now be described in conjunction with drawings in which:

FIG. 2A depicts a plan view illustrating a case used for the first embodiment;

FIG. 2B depicts a side view illustrating the case used for the first embodiment;

FIG. 2C depicts a plan view illustrating a cover member used for the first embodiment;

FIG. 2D depicts a side view illustrating the cover member used for the first embodiment;

FIG. 4A depicts a plan view illustrating a case used for a second embodiment of the optical waveguide circuit module in the invention;

FIG. 4B depicts a side view illustrating the case used for the second embodiment;

FIG. 4C depicts an illustration showing a state before the cover member is mounted in the optical waveguide module of the second embodiment;

FIG. 4D depicts a plan view for an appearance of the second embodiment;

FIG. 6 depicts an illustration showing one example of an conventional arrayed waveguide grating;

DETAILED DESCRIPTION

Figure 1:
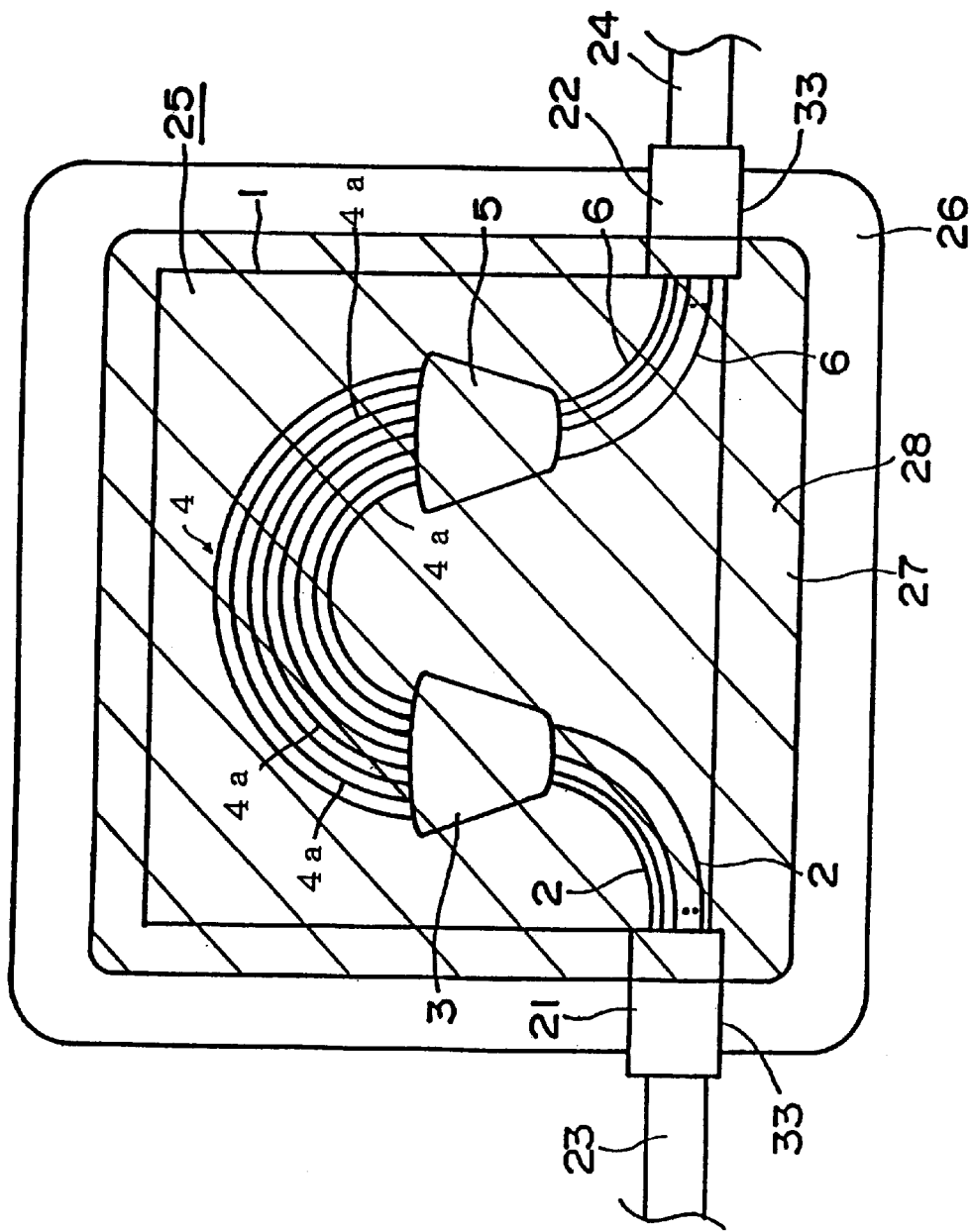
FIG. 1 depicts a configurational diagram for a main part illustrating a first embodiment of the optical waveguide circuit module in the invention.

As described above, the arrayed waveguide grating comprising the half waveplate 18 inserted is formed in which the insertion slit 17 for the half waveplate 18 is machined by a dicer, the half waveplate 18 is inserted into the slit and the half waveplate 18 is fixed to the insertion slit 17 using an adhesive. On this account, there have been problems that the arrayed waveguide grating comprising the half waveplate 18 inserted is difficult to fabricate and costs are increased. Additionally, the arrayed waveguide grating comprising the half waveplate 18 inserted has had a problem that so-called return loss is generated, which a part of light entered the half waveplate 18 returns to the input end (one) of the optical input waveguides 2. Therefore, it has been desired to develop an arrayed waveguide grating that can suppress the influence of the polarization dependent loss without disposing the half waveplate 18.

Then, a polarization independent type arrayed waveguide grating that can reduce the influence of the polarization dependent loss without disposing the half waveplate 18 was proposed. The details of this proposal are described in Japanese Patent Application (Application No. 380/2000, filed on Jan. 5, 2000).

The arrayed waveguide grating of this proposal is formed to have amounts of $B_2O_3$ and $P_2O_5$ to be doped in the over cladding greater than doped amounts in the conventional arrayed waveguide grating. According to this configuration, the proposed arrayed waveguide grating is formed to have a value B of birefringence generated in the waveguide forming region 10 (the over cladding, the core and the under cladding):

$$|B| \leq 5.34 \times 10^{-5}.$$

As described above, when the amounts of $B_2O_3$ and $P_2O_5$ to be doped in the over cladding are made greater, the following normalized composition can be made smaller than the normalized composition in the conventional arrayed waveguide grating. The normalized composition has a value shown in the following equation (1):

$$\text{Normalized composition} = (SiCl_4(\text{gas}))/[SiCl_4(\text{gas}) + PCl_3(\text{gas}) + BCl_3(\text{gas})] \qquad (1).$$

In addition, in the equation (1), each of $SiCl_4(\text{gas})$, $PCl_3(\text{gas})$ and $BCl_3(\text{gas})$ is an amount of each of gases having the composition fed at time when the Flame Hydrolysis Deposition method (FHD) is applied in fabricating the arrayed waveguide grating. Table 1 shows results that determined the normalized composition and a center wavelength shifted amount on the conventional arrayed waveguide grating and the arrayed waveguide grsatings of proposed dopant-rich examples 1 to 3.

TABLE 1

|  | Conventional Example | Proposed Example 1 | Proposed Example 2 | Proposed Example 3 |
|---|---|---|---|---|
| Normalized Composition | 42 | 40 | 36 | 33 |
| Center Wavelength Shifted Amount (nm) | 0.20 | 0.14 | 0.06 | 0.00 |

Furthermore, the center wavelength shifted amount shown in Table 1 is:
- a center wavelength $\lambda_{TM}$ of the transmitted spectra of the TM mode—a center wavelength $\lambda_{TE}$ of the transmitted spectra of the TE mode.

As shown in Table 1, the normalized composition is made smaller and thereby the center wavelength shifted amount of the transmitted spectra of each state of the polarization of the TE mode and the TM mode in the arrayed waveguide grating can be brought close to zero. That is, reducing the normalized composition described above allows the polarization dependent loss to come close to zero, the loss is caused by the difference between the effective index of the TE mode and the effective index of the TM mode in the light propagated through the arrayed waveguide 4.

However, the inventor learned by experiment that the reliability under a high temperature and high humidity environment is likely to be decreased when the normalized composition is reduced and the amounts of $B_2O_3$ and $P_2O_5$ to be doped in the over cladding are increased. That is, the inventor conducted a high temperature and high humidity test on both the conventional arrayed waveguide grating and the arrayed waveguide gratings of the proposed dopant-rich silica-based glass examples and examined a state of each of the arrayed waveguide gratings after the test. Consequently, particular changes were not seen in the conventional arrayed waveguide grating. On the other hand, in the arrayed waveguide gratings of the proposed examples, cracks were generated in the end part areas of the arrayed waveguide grating, as indicated by broken lines C shown in FIG. 6.

Additionally, the high temperature and high humidity test is that each of the arrayed waveguide gratings was placed under an atmosphere at a humidity of 100% at temperature of 120° C. and was allowed to stand for 100 hours in that state.

Figure 7A:
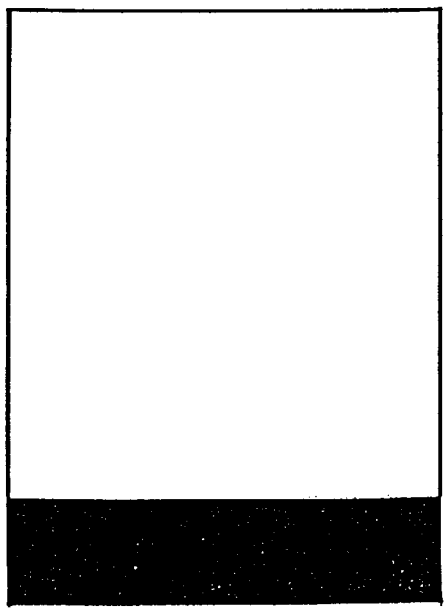
FIG. 7A depicts an illustration showing a state after a high temperature and high humidity test in the conventional arrayed waveguide grating.
Figure 7B:
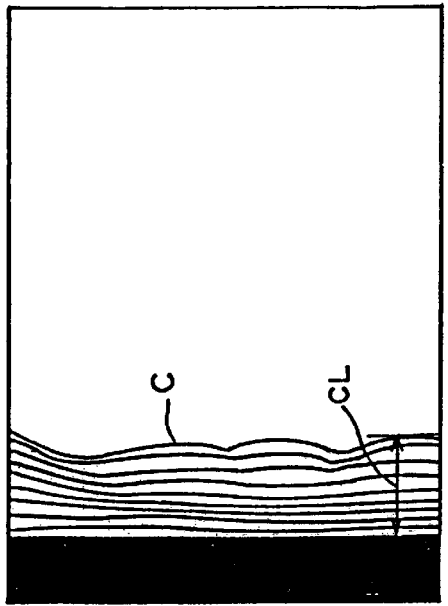
FIG. 7B depicts an illustration showing a state in which cracks are generated after the high temperature and high humidity test in the arrayed waveguide grating of a proposed example 1.
Figure 7C:
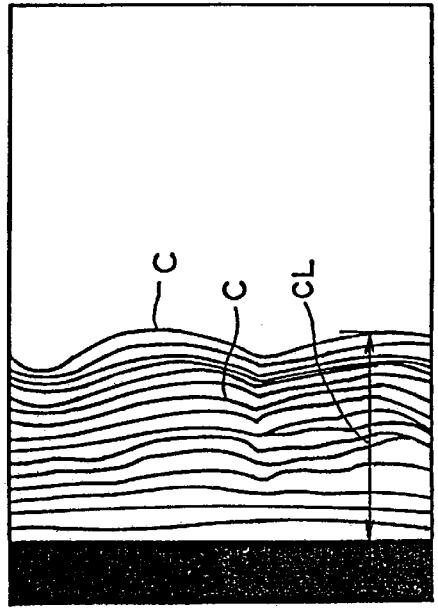
FIG. 7C depicts an illustration showing a state in which cracks are generated after the high temperature and high humidity test in the arrayed waveguide grating of a proposed example 2.
Figure 7D:
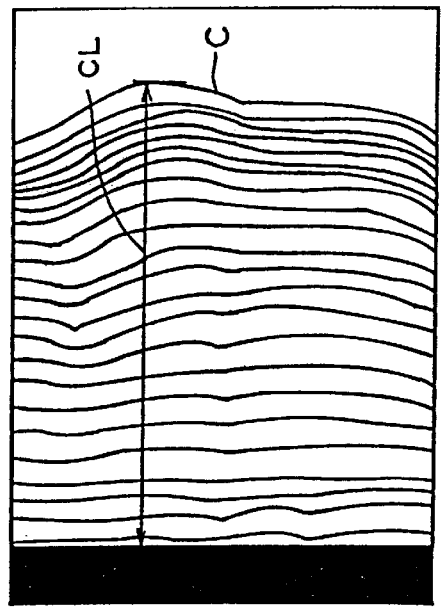
FIG. 7D depicts an illustration showing a state in which cracks are generated after the high temperature and high humidity test in the arrayed waveguide grating of a proposed example 3.

FIGS. 7A, 7B, 7C and 7D depict diagrams schematically illustrating a state of the generated cracks C based on photomacrographs of the end part areas of each of the arrayed waveguide gratings taken after the high temperature and high humidity test. FIG. 7A depicts a state of the conventional arrayed waveguide grating. FIG. 7B depicts a state of the arrayed waveguide grating of the proposed example 1. FIG. 7C depicts a state of the arrayed waveguide grating of the proposed example 2. FIG. 7D depicts a state of the arrayed waveguide grating of the proposed example 3.

Furthermore, Table 2 shows results that a distance of each of the cracks measured from the end face of the arrayed waveguide grating (CLs shown in FIGS. 7B, 7C and 7D). Moreover, as shown in Table 2, the CL cannot be measured in the conventional arrayed waveguide grating because cracks were not generated.

TABLE 2

|  | Conventional Example | Proposed Example 1 | Proposed Example 2 | Proposed Example 3 |
|---|---|---|---|---|
| CL($\mu$m) | — No cracks were generated. | 30 | 78 | 173 |

As apparent from FIGS. 7A, 7B, 7C and 7D and Tables 1 and 2, it was found that the polarization dependence of the arrayed waveguide grating can be decreased as the normalized composition is reduced, whereas cracks tend to be generated in the end part areas of the arrayed waveguide grating.

Then, the inventor thought that it is needed to propose the configuration where cracks are not generated even under a substantially severe environment of high temperature and high humidity equivalent to the high temperature and high humidity test at a humidity of 100% and a temperature of 120° C. in the arrayed waveguide grating having a reduced normalized composition, as the proposed examples. That is, the inventor thought that the configuration where the normalized composition is reduced and cracks are not generated even under the substantially severe environment of high temperature and high humidity is offered and thereby an optical waveguide module that can reduce the polarization dependency without disposing the half waveplate 18 and has high reliability even under the high temperature and high humidity environment can be provided.

Additionally, it is known that the arrayed waveguide grating has the temperature dependency of the light transmission center wavelength. Then, a temperature independent type arrayed waveguide grating to eliminate the temperature dependency of the light transmission center wavelength was proposed. The details of this proposal are described in Japanese Patent Application (Application No. 219205/2000, filed on Jul. 19, 2000).

Figure 5:
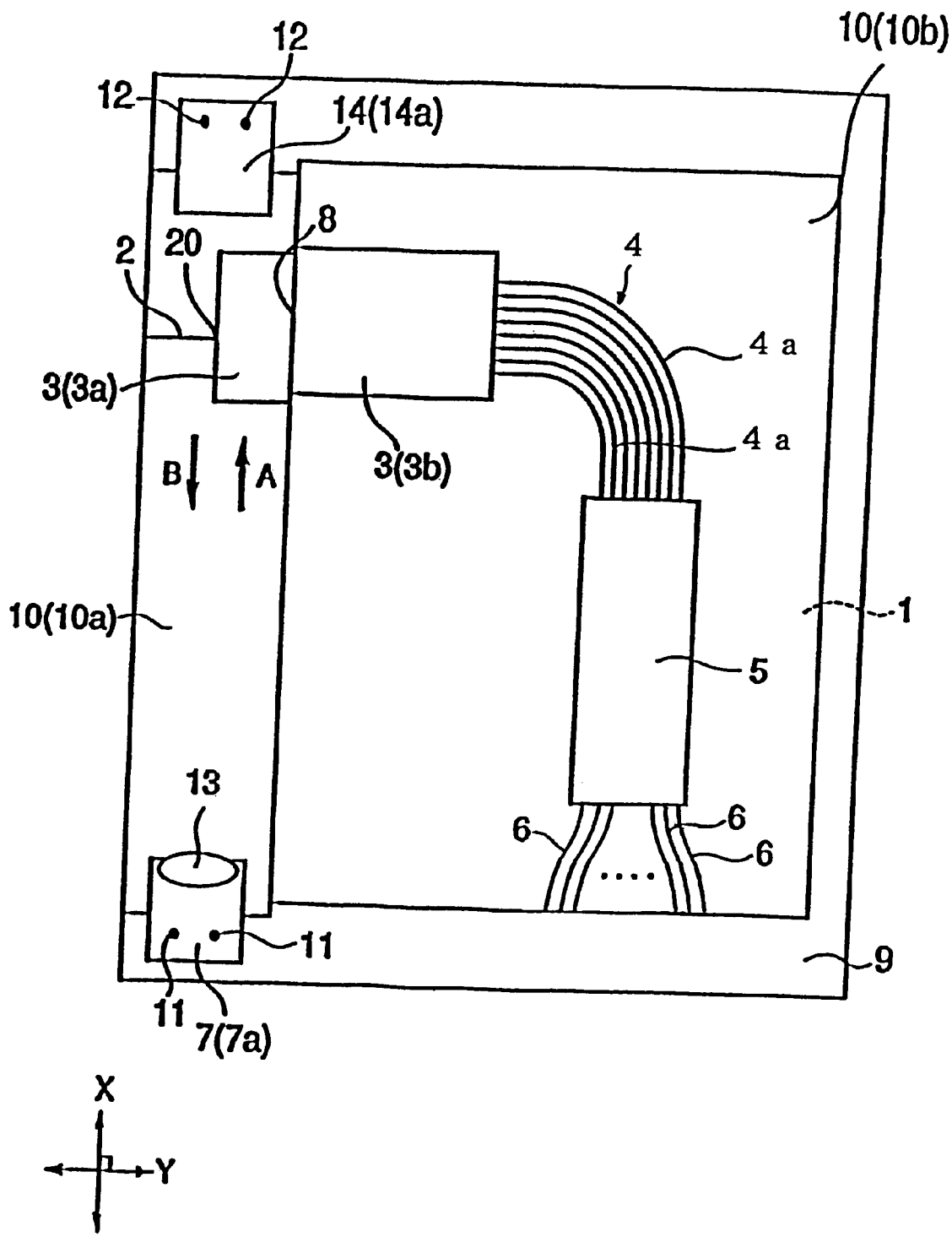
FIG. 5 depicts an illustration showing the configuration and the operation of a temperature independent type arrayed waveguide grating previously proposed.

FIG. 5 depicts an example of a basic configuration of the proposed temperature independent type arrayed waveguide grating. The arrayed waveguide grating shown in FIG. 5 forms a waveguide forming region 10 made of silica-based glass on a substrate 1. As similar to the conventional example, the waveguide forming region 10 has one or more of optical input waveguides 2 (here, it is one); a first slab waveguide 3; an arrayed waveguide 4 made of a plurality of channel waveguides 4a arranged side by side; a second slab waveguide 5; and a plurality of optical output waveguides 6. Each of the channel waveguides 4a and the optical output waveguides 6 is spaced side by side with a predetermined waveguide interval.

In the arrayed waveguide grating shown in FIG. 5, the first slab waveguide 3 is separated at separation face 8 that cross the light path passing through the first slab waveguide 3. The separation faces 8 are formed by cutting. Additionally, in the arrayed waveguide grating shown in FIG. 5, both the substrate 1 and the waveguide forming region 10 are also separated into two, in accordance with the separation of the first slab waveguide 3 at the separation face 8.

A waveguide forming region 10b has a separated slab waveguide 3b, the arrayed waveguide 4, the second slab waveguide 5 and the optical output waveguides 6. The substrate 1 under the waveguide forming region 10b is fixed to a base 9. The base 9 is formed of a material having a low thermal expansion coefficient such as silica glass or an Invar rod.

A waveguide forming region 10a has a separated slab waveguide 3a and the optical input waveguides 2. The waveguide forming region 10a and the substrate 1 thereunder are slidably disposed along the surface of the base 9 in the directions of arrows A and B. One end side of the waveguide forming region 10a is fixed to a high thermal expansion coefficient member 7 through an adhesive 13, and the other end side is position-regulated by a position regulating member 14.

The arrayed waveguide grating shown in FIG. 5 is characterized in that the first slab waveguide 3 is separated and the separated slab waveguide 3a side that has been formed by this separation at one side is slidably moved by a slide moving mechanism along the separation face 8, as described above. The slide moving mechanism is configured by disposing the high thermal expansion coefficient member 7, the base 9 and the position regulating member 14. Furthermore, the movement of the separated slab waveguide 3a side by the slide moving mechanism is performed in the direction to reduce the temperature dependent variation of each of the light transmission center wavelengths of the arrayed waveguide grating.

The high thermal expansion coefficient member 7 is the member having an upper plate part 7a disposed along the upper surface of the waveguide forming region 10a. A side plate part of the high thermal expansion coefficient member 7 is fixed to the base 9 with fixing parts 11. The high thermal expansion coefficient member 7 is formed of Al (aluminium) having a thermal expansion coefficient of $2.5 \times 10^{-5} (1/K)$, for example.

The position regulating member 14 is a member having an upper plate part 14a disposed along the upper surface of the waveguide forming region 10a. A side plate part of the position regulating member 14 is fixed to the base 9 with fixing parts 12. The inner wall of the upper plate part of the position regulating member 14 is abut to the upper surface of the waveguide forming region 10a; the waveguide forming region 10a is prevented from being displaced to the upper side with respect to the base 9, that is, the Z-axial direction perpendicular to the X-Y plane when the waveguide forming region 10a is slidably moved.

In the arrayed waveguide grating shown in FIG. 5, when the temperature of the arrayed waveguide grating are changed, the slide moving mechanism slidably moves the separated slab waveguide 3a side along the separation face 8. This movement is the direction to reduce the temperature dependent variation of each of the light transmission center wavelengths of the arrayed waveguide grating, which is performed in the direction of the arrows A or B in FIG. 5. This slide movement slidably moves the separated slab waveguide 3a and the optical input waveguies 2.

Accordingly, according to the proposed arrayed waveguide grating, the light transmission center wavelength shift accompanying this temperature change can be eliminated even though the environment of the arrayed waveguide grating to be used is changed. That is, this arrayed waveguide grating is formed to be the so-called temperature independent type arrayed waveguide grating, which is independent of environment temperature.

Meanwhile, in this proposed temperature independent type arrayed waveguide grating, it is important to prevent the reflection in the separation face 8 and to suppress connection loss between the separated slab waveguide 3a and the separated slab waveguide 3b. The prevention of the reflection by the separation face 8 is made possible by applying a matching grease that the refractive index thereof matches that of silica-based glass on the separation face 8. However, when the inventor performed the high temperature and high humidity test to this temperature independent type arrayed waveguide grating and examined the state of the arrayed waveguide grating after through the high temperature and high humidity test, it was known that the matching grease is evaporated and suppressing the connection loss by the matching oil becomes difficult.

Accordingly, the inventor thought that a configuration where a refractive index matching agent is not evaporated even under the substantially severe environment of high temperature and high humidity equivalent to the high temperature and high humidity test at a humidity of 100% at a temperature of 120° C. needs to be proposed in the configuration where the refractive index matching agent is applied on the separation faces for separating the optical waveguide circuit chip.

That is, the inventor thought that a configuration where the evaporation of the refractive index matching agent is suppressed even under the substantially severe environment of high temperature and high humidity is offered to obtain an optical waveguide module that can realize both suppressing an increase in the connection loss in the separation faces 8 and compensating the light transmission wavelength and has high reliability in the temperature independent type arrayed waveguide grating.

The optical waveguide circuit module in one aspect of the invention is an optical waveguide circuit module highly reliable under the high temperature and high humidity conditions. One example of the optical waveguide circuit module of the invention is an optical waveguide circuit module that can suppress the crack generation under the high temperature and high humidity conditions even though dopant amounts of $B_2O_3$ and $P_2O_5$ to be doped in the over cladding of the optical waveguide circuit chip are increased. Another example of the optical waveguide circuit module of the invention is an optical waveguide circuit module that can suppress an increase in the connection loss in the separation faces under the high temperature and high humidity conditions even though it has a configuration where a waveguide chip is cut and lights are transmitted through the separation faces.

Hereafter, the embodiments of the invention will be described in accordance with the drawings. Additionally, in the description of each of the following embodiments, the same portions as the conventional example are designated the same numerals and signs, omitting the overlapping description. FIG. 1 depicts a main part configuration of a first embodiment of the optical waveguide circuit module in the invention. This drawing is a sectional view that the optical waveguide circuit module is cut horizontally.

As shown in the same drawing, the optical waveguide circuit module of the first embodiment has a case 26. Inside a chip housing part 27 of the case 26, an arrayed waveguide grating as an optical waveguide circuit module 25 is housed. In the chip housing part 27, a water-insoluble oil 28 is filled. Additionally, in the same drawing, the region of the water-insoluble oil 28 filled is indicated by oblique lines. In the first embodiment, a silicon oil made by Shin-Etsu Chemical Co., Ltd. (the product name is OF-38E (1000)) is applied as the water-insoluble oil 28.

Furthermore, not shown in the same drawing, a cover member 30 shown in FIGS. 2C and 2D is disposed on the upper side of the case 26. The case 26 and the cover member 30 form a housing for accommodating the optical waveguide circuit chip 25. The optical waveguide circuit module of the first embodiment is formed by disposing the housing inside a module case not shown.

The case 26 is formed with fitting recessed parts 33 for optical fiber arrays 21 and 22 where a plurality of optical fibers is arranged and fixed. The optical fiber arrays 21 and 22 are fit and fixed to the left and right fitting recessed parts 33, respectively. Optical fiber ribbons 23 and 24 comprising a plurality of optical fibers arranged in pararell are connected to the optical fiber arrays 21 and 22, respectively. The fitting recessed parts 33 where the optical fiber arrays 21 and 22 are disposed, the case 26 and the cover member 30 are sealed with an epoxy adhesive. When a specific example of the epoxy adhesives is named, it is Cemedaine High Super 5. However, the adhesive for sealing is not defined to the epoxy adhesives; it may be those that can seal the water-insoluble oil 28 which is inside the module case not to leak out.

The optical waveguide circuit chip 25 is the polarization independent type arrayed waveguide grating of the proposed example 3. That is, the optical waveguide circuit chip 25 has the same configuration as the conventional arrayed waveguide grating shown in FIG. 6 and is formed omitting the slit 17 and the half waveplate 18. Additionally, in the optical waveguide circuit chip 25, the amounts of $B_2O_3$ and $P_2O_5$ to be doped in the over cladding of the waveguide forming region 10 are set greater than the doped amounts in the conventional arrayed waveguide grating. In the optical waveguide circuit chip 25, the normalized composition is to be 33 and a value B of birefringence generated in the waveguide forming region 10 (in the over cladding, the core and the under cladding) is set:

$$|B| \leq 5.34 \times 10^{-5}.$$

To the input end of each of the optical input waveguides 2 of the optical waveguide circuit chip 25, each of optical fibers arranged in the optical fiber array 21 is connected. To the output end of each of the optical output waveguides 6 of the optical waveguide circuit chip 25, each of optical fibers arranged in the optical fiber array 22 is connected.

On the substrate 1 side of the optical waveguide circuit chip 25, a temperature control device such as a Peltier device is disposed. In the same drawing, this temperature control device is not shown. The optical waveguide circuit module is configured to maintain the temperature of the optical waveguide circuit chip 25 constant by the temperature control device.

The first embodiment is configured as described above. Next, a fabricating method of the optical waveguide circuit module of the first embodiment will be described. First, the case 26 shown in FIGS. 2A and 2B and the cover member 30 shown in FIGS. 2C and 2D are prepared. As shown in FIGS. 2A and 2B, the case 26 is formed with a temperature control device housing hole 29 communicating with the chip housing part 27 and having a dimension smaller than that of the chip housing part 27. The temperature control device housing hole 29 is formed to be a through hole. Additionally, the case 26 is formed with the fitting recessed parts 33, as described above. As shown in FIGS. 2C and 2D, the cover member 30 is penetrated and formed with an oil injecting hole 31 and an air vent hole 32.

Figure 3A:
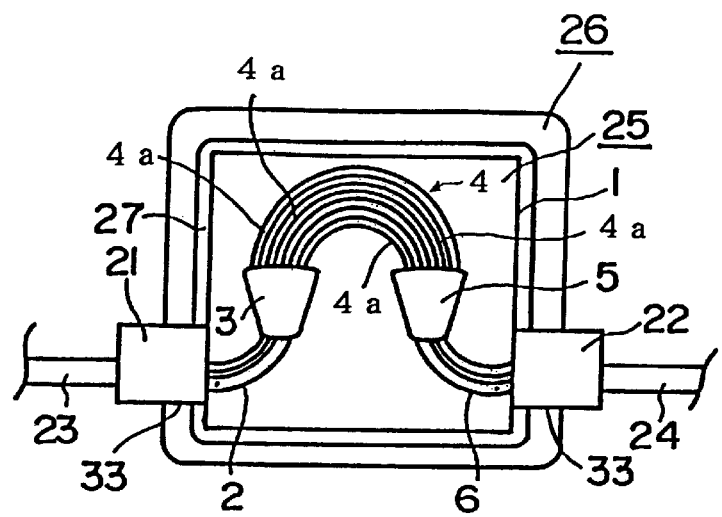
FIGS. 3A, 3B and 3C depict illustrations showing fabricating steps of the first embodiment.

When the optical waveguide circuit module of the first embodiment is fabricated, the optical waveguide circuit chip 25 is housed in the chip housing hole 27 of the case 26 as shown in FIG. 3A. Furthermore, a temperature control device such as a Peltier device is inserted into the temperature control device housing hole 29 (not shown in the same drawing). Moreover. The optical fibers of the optical fiber arrays 21 and 22 are center-adjusted to the optical input waveguides 2 and the optical output waveguides 6 of the optical waveguide circuit chip 25 and the optical fiber arrays 21 and 22 are fixed to the optical waveguide circuit chip 25. Then, the optical waveguide circuit chip 25 is fixed inside the chip housing hole 27 and the optical fiber arrays 21 and 22 are fit and fixed to the fitting recessed parts 33.

Figure 3B:
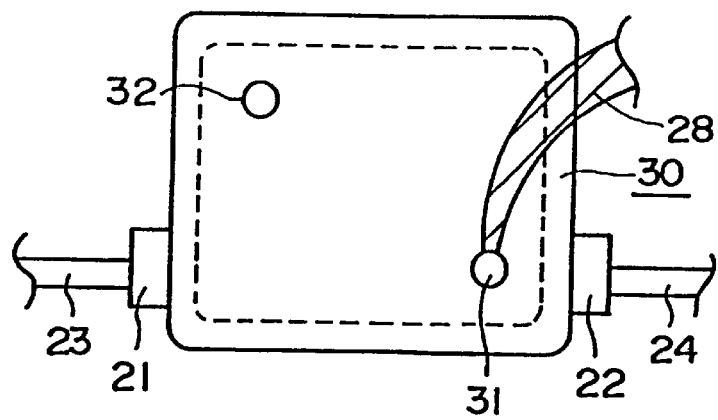

After that, as shown in FIG. 3B, the cover member 30 is covered on the case 26 and the case 26 is attached or packed with the cover member 30. Additionally, in the first embodiment, the fitting recessed parts 33 disposed with the optical fiber arrays 21 and 22, the case 26 and the cover member 30 are sealed with the epoxy adhesive. In that state, the water-insoluble oil 28 is injected from the oil injecting hole 31 and the inside of the chip housing hole 27 is filled with the water-insoluble oil 28.

Figure 3C:
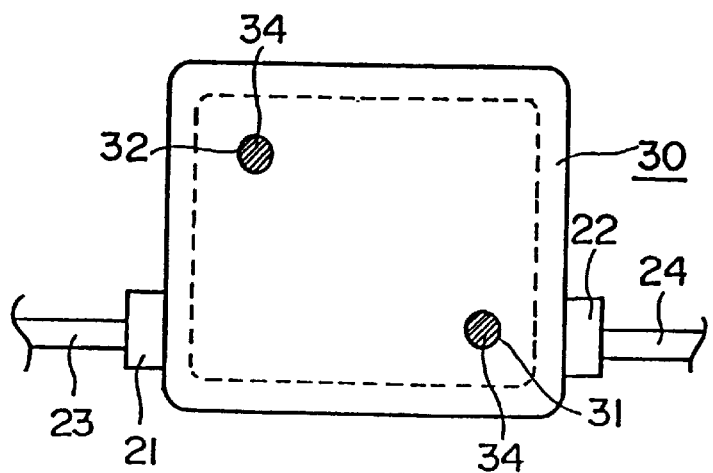

Then, as shown in FIG. 3C, a sealing agent 34 is applied in the oil injecting hole 31 and the air vent hole 32 for sealing. Thereby, the optical waveguide circuit chip 25 is formed in the state in which it is housed inside the housing formed of the case 26 and the cover member 30, which is liquid-tightly filled with the water-insoluble oil 28. Lastly, the housing is arranged and fixed inside the module case (not shown).

The first embodiment is thus fabricated. When the inventor performed the high temperature and high humidity test on the optical waveguide circuit module of the first embodiment, no cracks were generated in the optical waveguide circuit chip 25 inside the optical waveguide circuit module. Additionally, when the transmission characteristics thereof were examined after the test had been performed, the transmission characteristics after the test were the same as those before the test.

According to the first embodiment, the optical waveguide circuit chip 25 was housed inside the housing filled with the water-insoluble oil 28 and was formed to be the module. Therefore, moisture can be prevented from entering the optical waveguide circuit chip 25 even though the optical waveguide circuit module is placed under the environment of high temperature and high humidity. On this account, according to the first embodiment, the optical waveguide circuit chip 25 is hardly influenced by the environment of high temperature and high humidity.

Accordingly, the crack generation under the high temperature and high humidity conditions can be suppressed as described above, even though the dopant amounts of $B_2O_3$ and $P_2O_5$ to be doped in the waveguide forming region 10 of the optical waveguide circuit chip 25 are set greater than the dopant amounts in the conventional arrayed waveguide grating to form the configuration that is subject to moisture as the first embodiment.

Additionally, according to the first embodiment, it is that the polarization independent type arrayed waveguide grating without disposing the half waveplate is formed to be the optical waveguide circuit chip 25 and this optical waveguide circuit chip 25 is housed inside the housing. Accordingly, the first embodiment can avoid various problems that have been the problems in the conventional arrayed waveguide grating with the half waveplate 18 and can be made the optical waveguide circuit module having high reliability even under the high temperature and high humidity conditions, as described above.

FIGS. 4A to 4D depict illustrations showing a second embodiment of the optical waveguide circuit module in the invention by fabricating process diagrams. Additionally, in the description of the second embodiment, the same portions as the first embodiment are designated the same numerals and signs, omitting the overlapping description.

A first feature that the second embodiment differs from the first embodiment is in that the optical waveguide circuit chip 25 is formed to be the temperature independent type arrayed waveguide grating represented by the configuration shown in FIG. 5. A second feature that the second embodiment differs from the first embodiment is in that a water-insoluble oil (hereafter, it is called a matching oil) 28 having the refractive index consistency with silica-based glass forming the waveguide forming region 10 is applied as the water-insoluble oil 28.

When an example of the matching oil 28 applied to the second embodiment is named, there is OF-38E (a viscosity of 7 to 10000 $mm^2/s$ (cSt) at a temperature of 25° C.), a name of the product made by Shin-Etsu Chemical Co., Ltd. Alternatively, another example of the matching oil 28 is OP-101, a name of the product made by Dow Corning Toray Silicon Co., Ltd., X38-7427 or X38-452, names of the products made by Shin-Etsu Chemical Co., Ltd.

Furthermore, in FIG. 5, the first slab waveguide 3 was cut by the separation faces 8 in the X-axial direction of FIG. 5 in the optical waveguide circuit chip 25. However, an optical waveguide circuit chip 25 applied to the optical waveguide circuit module of the second embodiment is formed in which a first slab waveguide 3 is slantly cut to form a separated slab waveguide 3a and a separated slab waveguide 3b, as shown in FIG. 4C. Moreover, in FIG. 4C, the high thermal expansion coefficient member 7 or the position regulating member 14 shown in FIG. 5 is omitted. However, the optical waveguide circuit chip 25 of the optical waveguide circuit module of the second embodiment has a slide moving mechanism having the high thermal expansion coefficient member 7 or the position regulating member 14, for example, for performing the slide movement.

When the first slab waveguide 3 is slantly cut to form the arrayed waveguide grating being the optical waveguide circuit chip 25 as the second embodiment, the same effect as the arrayed waveguide grating shown in FIG. 5 can be exerted. That is, in the second embodiment, the slide moving mechanism slidably moves the separated slab waveguide 3a side along the separation face 8 in the direction to reduce the temperature dependent variation of each of the light transmission center wavelengths of the arrayed waveguide grating. Thereby, the second embodiment can also exert the same effect as the arrayed waveguide grating shown in FIG. 5.

Additionally, in the second embodiment, the temperature dependent variation of the light transmission center wavelengths of the arrayed waveguide grating can be reduced by the slide movement of the slide moving mechanism, without disposing the temperature control device such as the Peltier device that was disposed in the first embodiment. On this account, the temperature control device is omitted in the second embodiment. Then, corresponding to this, a case 26 is formed to have a configuration with no temperature control device insertion hole as shown in FIGS. 4A and 4B.

Furthermore, the second embodiment is configured to house optical fiber arrays 21 and 22 inside a chip housing hole 27 of the case 26 along with the optical waveguide circuit chip 25, as shown in FIG. 4C. Accordingly, fitting recessed parts 33 are configured to fit and fix optical fiber ribbons 23 and 24 connected to the optical fiber arrays 21 and 22. Moreover, in the second embodiment, the fitting recessed parts 33 disposed with the optical fiber arrays 21 and 22, the case 26 and a cover member 30 are also sealed with the same epoxy adhesive as the first embodiment. As similar to the first embodiment, this adhesive for sealing is not defined to the epoxy adhesives, which may be those that can seal the matching oil 28 which is inside the module case not to leak out.

As almost similar to the first embodiment, the optical waveguide circuit chip 25 is fixed to the chip housing hole 27 of the case 26 shown in FIGS. 4A and 4B in the second embodiment, as shown in FIG. 4C. Besides, as shown in FIG. 4D, the cover member 30 is covered, the matching oil 28 is injected from an oil injecting hole 31, and the oil injecting hole 31 and an air vent hole 32 are sealed to form the optical waveguide circuit module.

The second embodiment is thus fabricated. The optical waveguide circuit module of the second embodiment was allowed to stand for 100 hours at a humidity of 100% at a temperature of 120° C. and then transmission loss were examined. Consequently, the transmission loss after the test were the same as that before the test. Additionally, the connection loss generated by cutting the first slab waveguide 3 at the separation faces 8 were as small as 0.4 dB or less before and after the test.

According to the second embodiment, the optical waveguide circuit chip 25 is housed inside the housing that is filled with the matching oil 28 and thus the evaporation of the matching grease can be prevented. On this account, the matching grease of the refractive index matching agent applied on the separation faces 8 of the optical waveguide circuit chip 25 can be suppressed from evaporating, even though the optical waveguide circuit module of the second embodiment is placed under the high temperature and high humidity environment.

In addition, the matching oil 28 used in the second embodiment has the refractive index consistency with silica-based glass forming a waveguide forming region 10 of the optical waveguide circuit chip 25. Therefore, the connection loss in the separation face 8 can be suppressed because the matching oil 28 enters between the separation face 8.

On this account, according to the second embodiment, it can be formed to be the optical waveguide circuit module of high reliability without generating an increase in the connection loss in the separation face 8 even under the high temperature and high humidity conditions.

Furthermore, according to the second embodiment, the temperature independent type arrayed waveguide grating of the proposed example is formed to be the optical waveguide circuit chip 25 and this optical waveguide circuit chip 25 is housed inside the housing. Accordingly, the optical waveguide circuit module of the second embodiment can be formed to be an excellent optical waveguide circuit module where the light transmission center wavelengths of the arrayed waveguide grating are not varied even though the environment temperature of the optical waveguide circuit module are changed.

Moreover, according to the second embodiment, the light transmission center wavelengths of the arrayed waveguide grating are not varied dependent on the temperature even though the temperature control device such as the Peltier device is not disposed as the conventional one. On this account, the second embodiment can be formed to have a simple device configuration as compared with the optical waveguide circuit module having the temperature control device. Besides, the second embodiment does not need a power supply to the temperature control device. Therefore, it can save energy by that amount and costs can also be decreased.

Additionally, the invention is not limited to the embodiments, which can adopt various embodiments. For example, the first embodiment formed the optical waveguide circuit chip 25 to be the polarization independent type arrayed waveguide grating with the small normalized composition. On the other hand, the second embodiment formed the optical waveguide circuit chip 25 to be the temperature independent type arrayed waveguide grating where the first slab waveguide 3 is separated at the separation face 8. However, when the optical waveguide circuit chip 25 used in the optical waveguide circuit module of the invention is formed to be the arrayed waveguide grating, the composition or configuration thereof is not defined specifically, which can be set properly.

For example, in the optical waveguide circuit chip 25 of the arrayed waveguide grating disposed in the second embodiment, the amounts of $B_2O_3$ and $P_2O_5$ to be doped in the over cladding may be set greater as similar to the first embodiment. Then, according to this configuration, the value B of birefringence generated in the waveguide forming region 10 is set:

$$|B| \leq 5.34 \times 10^{-5}.$$

Thereby, the optical waveguide circuit chip 25 having this configuration is formed to be a temperature and polarization independent type arrayed waveguide grating.

As described above, the optical waveguide circuit chip 25 is formed to be the temperature and polarization independent type arrayed waveguide grating, the optical waveguide circuit chip 25 is housed inside the housing filled with the matching oil 28 and then the optical waveguide circuit module is formed. Thereby, the arrayed waveguide grating can suppress both the polarization dependency and the temperature dependency of wavelengths of the lights to be multiplexed and demultiplexed and it can form a further excellent optical waveguide circuit module of high reliability even under the high temperature and high humidity conditions.

Furthermore, in each of the embodiments, the optical waveguide circuit chip 25 was formed to be the arrayed waveguide grating. However, the optical waveguide circuit chip 25 disposed in the optical waveguide circuit module of the invention is not defined to be the arrayed waveguide grating unnecessarily. The optical waveguide circuit module can be formed by disposing various optical waveguide circuit chips comprising the waveguide forming region made of silica-based glass formed on the substrate.

What is claimed is:

1. An optical waveguide circuit module comprising:

an optical waveguide circuit chip comprising a waveguide forming region made of silica-based glass formed on a substrate; and a housing for accommodating the optical waveguide circuit chip, wherein a water-insoluble oil is filled inside the housing.

2. An optical waveguide circuit module according to claim 1, wherein a value B of birefringence generated in the waveguide forming region of the optical waveguide circuit chip is:

$|B| \leq 5.34 \times 10^{-5}$, and the waveguide forming region of said optical waveguide circuit chip is formed with:
        one or more of optical input waveguides;
        a first slab waveguide connected to output ends of said optical input waveguides;
        an arrayed waveguide made of a plurality of channel waveguides arranged side by side, the channel waveguides being connected to an output end of said first slab waveguide, and the channel waveguides having a different set amount each other;
        a second slab waveguides connected to an output end of said arrayed waveguide; and
        a plurality of optical output waveguides arranged side by side, the optical output waveguides being connected to an output end of said second slab waveguide.

3. An optical waveguide circuit module according to claim 1, wherein the waveguide forming region of the optical waveguide circuit chip is formed with:
        one or more of optical input waveguides;
        a first slab waveguide connected to output ends of said optical input waveguides;
        an arrayed waveguide made of a plurality of channel waveguides arranged side by side, the channel waveguides being connected to an output end of said first slab waveguide, and the channel waveguides having a different set amount each other;
        a second slab waveguide connected to an output end of said arrayed waveguide;
        a plurality of optical output waveguides arranged side by side, the optical output waveguides being connected to an output end of said second slab waveguide; and
        separation face for separating at least one of said first and second slab waveguides, the separation face crossing light path passing through the slab waveguide, and
        said optical waveguide circuit chip is formed with a slide moving mechanism for slidably moving at least one side of the separated slab waveguides along said separation face dependent on a temperature.

4. An optical waveguide circuit module according to claim 1, wherein the water-insoluble oil has refractive index consistency with silica-based glass forming the waveguide forming region.

5. An optical waveguide circuit module according to claim 3, wherein a water-insoluble oil has refractive index consistency with silica-based glass forming the waveguide forming region.

* * * * *